United States Patent [19]

Capaccioni et al.

[11] 4,230,855
[45] Oct. 28, 1980

[54] METHOD OF PREPARATION OF IMPROVED NIGROSINE AND INDULINO DYES

[75] Inventors: Mario Capaccioni, Milan; Laurentino Gentile, Cogliate; Aldo Rusconi, Milan, all of Italy

[73] Assignee: Montedison S.p.A., Milan, Italy

[21] Appl. No.: 955,798

[22] Filed: Oct. 30, 1978

[30] Foreign Application Priority Data

Oct. 31, 1977 [IT] Italy ................................ 29174 A/77

[51] Int. Cl.³ .......................................... C07D 241/36
[52] U.S. Cl. ..................................... 544/348; 106/22; 106/23; 106/288 Q; 427/340; 525/6
[58] Field of Search ......................... 544/348; 260/208

[56] References Cited

U.S. PATENT DOCUMENTS

| | | | |
|---|---|---|---|
| 2,328,759 | 9/1943 | Wahl | 544/348 |
| 2,486,562 | 11/1949 | Iamarino | 544/348 X |

FOREIGN PATENT DOCUMENTS 1045129  10/1966  United Kingdom ..................... 544/348

*Primary Examiner*—Floyd D. Higel
*Attorney, Agent, or Firm*—Morgan, Finnegan, Pine, Foley & Lee

[57] ABSTRACT

Nigrosine and induline dyes having improved rheological properties are prepared by treating a base of the nigrosine or induline series with between 15 and 30% by weight of phthalic anhydride, at a temperature between 135° and 150° C. The resulting dyes are readily dispersible in plastics and inks and provide finished products having improved flowability.

2 Claims, No Drawings

METHOD OF PREPARATION OF IMPROVED NIGROSINE AND INDULINO DYES

FIELD OF THE INVENTION

This invention relates to a method of preparing color bases of the nigrosine and induline series and in particular to color bases of the nigrosine and induline series having improved applicative characteristics in consequence of a treatment of said bases with phthalic anhydride.

BACKGROUND OF THE ART

Nigrosines and indulines are azine dyes having blue, violet and black shades. They have a considerable technical importance due to the low cost and to the variety of applications, which are the ones typical of the solvent dyes. They can be employed to color waxes, lakes, shoe-polishes, printing inks, ribbons for typewriters and plastic materials.

The indulines are the products obtained from the reaction of aniline and aniline hydrochloride with 4-aminoazobenzene. The nigrosines are the products obtained from the reaction of aniline with nitrobenzene in the presence of ferrous chloride and hydrochloric acid.

Both nigrosine and indulines are complex mixtures of dyes. The composition of these mixtures depends on the reaction conditions (melting) employed when preparing same, and in particular on the reaction duration and temperature. The higher the temperature, the more aniline residues enter the molecule and the bluer the product becomes. In "Ullmanns Encyklopeadie der Technischen Chemie" 3rd ed. (1960), vol. 12, pages 733-4, there are listed seven (7) components present in the induline melting.

The induline and nigrosine bases, by consequence, are not unitary compounds (as one can easily infer from a thin layer chromatography). As a result of their syntheses, they contain not only highly phenylated components such as, for example, anilido N-phenylphenosafranine (Nigrosine Base G), anilido N,N'-diphenylphenosafranine (Induline 3B) and dianilido-N,N'-diphenylphenosafranine (Induline 6B), but also impurities such as undesirable colored products having a lower condensation degree and a lower molecular weight (many of them contain free amino groups), oxidation products and aromatic amines.

This non-homogeneity of composition represents a remarkable drawback for the above-mentioned applications of the indulines and nigrosines.

OBJECTS OF THE INVENTION

It is an object of this invention to provide compositions based on nigrosines and indulines which are useful in all of the applications typical of these dyes, and in particular in the coloring of plastics and in the preparation of inks, i.e., in those applications requiring the employed dye to be easily dispersible and capable of providing finished products characterized by a high fluidity and flowability.

It is another object to provide a process for the preparation of such compositions.

These and other objects which will be apparent from the description which follows and from the examples are achieved by the invention herein described.

DESCRIPTION OF THE INVENTION

This invention comprises a process for preparing azine dyes having improved applicative characteristics, characterized in that the aziline dye is treated with phthalic anhydride.

Furthermore, the compositions prepared according to the present invention are profitably used in the applications where the nigrosines and indulines are utilized as free bases. For example, in the paper printing method "moisture set printing", the prints obtained by utilizing the formulations of this invention possess a lesser sublimability and less odor during the printing process and during storage.

For the applications in inks it is advisable to add during the preparation of the formulation a certain amount of mineral oil, which imparts improved rheological properties to the ink.

The formulations of the present invention are prepared by treating the nigrosines and the indulines with phthalic anhydride, in dry conditions, in a temperature range of from 135° to 150° C. and for a time varying from 2 to 4 hours.

According to another feature of this invention, the formulations can be prepared by subjecting to the treatment with phthalic anhydride, under the abovesaid conditions, directly the products as such of the induline and nigrosine synthesis respectively, without any necessity of isolating and purifying same.

This treatment "in loco" provides formulations endowed with the applicative characteristics mentioned hereinbefore, and offers also the advantage—and this is another feature of the present invention—of abolishing purifying post-treatments, because they are no longer necessary.

The amount of phthalic anhydride to be used for obtaining the formulations of this invention is comprised between 15 and 30% by weight, with reference to the azine base.

The following examples are given to illustrate the present invention, without being however a limitation thereof.

DESCRIPTION OF THE SPECIFIC EMBODIMENTS

EXAMPLE 1

First Step: Preparation of Aminoazobenzene and Induline

Melting

This first step, the preparation of the induline base, was carried out according to the operative modalities described in publication BIOS 1433, pages 82, 93 and 104, incorporated herein by reference, starting from the following feeds:

1,000 kg of pure aniline
1,000 kg of recovered aniline
112 kg of 100% hydrochloric acid as 20 Bé solution
140 kg of sodium nitrite.

To the resulting amonoazobenzene mass there were added:
81 kg of 100% hydrochloric acid as 20 Bé solution
190 kg of a 100% ferrous chloride solution.

The whole was heated to 150° C. and the pouring of 435 kg of nitrobenzene was started. The temperature was kept at 170° C. for 3 hours. It was alkalized and aniline was distilled.

Second Step: Drying and Treatment with Phthalic Anhydride

Into an iron Venuleth the mass and the mother liquors were discharged very rapidly.

Cold water was introduced thereinto for two reasons:
1. for thoroughly solidifying the semi-molten induline mass, and
2. for washing said mass, first by shifting the mother liquors, then by removing the inorganic salts.

The wash waters were then tapped. It was dried under vacuum, so obtaining a semi-molten dried mass. Into the Venuleth there were added:
375 kg of phthalic anhydride Steam jacket heating was carried on.

After 2 hours the mass was well molten and ropy, and the temperature ranged from 145° to 148° C.

It was kept under stirring for further 3 hours, whereupon it was cooled down by water circulation in the jacket.

The product solidified and was crushed by the bars of the Venuleth.

The dry product was discharged into containers and then ground. 1,540 kg of induline base were thus obtained.

EXAMPLE 2

First Step: Preparation of Aminoazobenzene and Induline

Melting

It was operated as in Example 1, starting from the following amounts:
2,000 kg of aniline (both pure and recovered)
160 kg of 100% hydrochloric acid as 20 Bé solution
200 kg of sodium nitrite.

The aminoazobenzene mass was additioned with:
115 kg of 100% hydrochloric acid as 20 Bé solution
75 kg of a 100% ferrous chloride solution.

At 135° C. and in 30–40 minutes, 195 kg of nitrobenzene were poured thereinto. The whole was maintained at 170° C. for 3 hours. It was alkalized and aniline was distilled.

Second Step: Drying and Treatment with Phthalic Anhydride

The discharge into the Venuleth was effected according to Example 1, and drying was carried out by means of steam at 4 atm. circulating in the jacket.

230 kg of phthalic anhydride in flakes were added into the Venuleth.

After 2 hours the mass appeared well molten and ropy.

The temperature was 145°–148° C.

It was stirred for further 3 hours.

Then it was cooled by making air circulate in the Venuleth jacket.

The product solidified and was crushed.

The dry product was discharged into containers and was ground. 1,200 kg of induline base were thus obtained.

EXAMPLE 3

It was operated as in Example 2 up to the treatment with phthalic anhydride included. A sample of the crushed product (123 g) was additioned (after grinding) with mineral oil FL (10 g) to improve the rheological characteristics of the inks.

EXAMPLE 4

A formulation prepared as in Example 1 was dispersed in the resin at a concentration of 1% on the resin weight by means of a mixer, at a temperature of 110° C. for 4 minutes. The foil so obtained was reduced to powder, press-molded in a mold and countermold at a temperature of 155°–160° C., for a time period of 60 seconds for each millimeter (mm) of thickness. A bright black manufactured article having excellent general characteristics was thus obtained.

EXAMPLE 5

A formulation prepared as in Example 3 was salified at 120° C. with olein in a ratio by weight of 1:4. The resulting oleate was added to the carbon black dispersion, prepared according to the conventional methods and formulations, in an amount of 5%. A printing ink was obtained which, when applied on newsprint, provided a deep black of neutral nuance. The rheological characteristics of the ink, in comparison with those obtained by using a conventional induline, were as follows:

|  | $\eta$ (cp) $\infty$ | $\tau_0$ (dyne cm$^{-2}$) |
| --- | --- | --- |
| Conventional induline | 25 | 28 |
| Induline treated with phthalic anhydride | 28 | 16 |

The viscosities were determined on Rheomat 30 at 20° C. The improved flowing characteristic was evidenced by the lower flowing limit ($\tau_o$). The rheological tests evidenced also a lesser thixotropy of the induline treated with phthalic anhydride, which resulted in a better flowability and fluidity upon application.

We claim:

1. A process for preparing a nigrosine base or an induline base having improved dispersibility, fluidity and flowability in the coloring of plastics and in the preparation of inks, comprising treating a nigrosine base or induline base, at a temperature between 135° and 150° C., with between 15 and 30% by weight of phthalic anhydride, based on the weight of the base.

2. A process according to claim 1, comprising treating with said phthalic anhydride in situ said nigrosine base or induline base coming from the synthesis thereof.

* * * * *

UNITED STATES PATENT AND TRADEMARK OFFICE
CERTIFICATE OF CORRECTION

PATENT NO. : 4,230,855
DATED : October 28, 1980
INVENTOR(S) : Mario Capaccioni et al It is certified that error appears in the above-identified patent and that said Letters Patent are hereby corrected as shown below:

On the title page, the name of the assignee should correctly read -- Aziende Colori Nazionali Affini ACNA S.p.A. --

Signed and Sealed this

Twenty-fourth Day of February 1981

[SEAL]

Attest:

RENE D. TEGTMEYER

Attesting Officer     Acting Commissioner of Patents and Trademarks